US011679507B2

(12) United States Patent
Katsiaris et al.

(10) Patent No.: US 11,679,507 B2
(45) Date of Patent: Jun. 20, 2023

(54) ROBOTIC STRUCTURE CALIBRATIONS

(71) Applicant: Hewlett-Packard Development Company, L.P., Spring, TX (US)

(72) Inventors: Pantelis Katsiaris, Bristol (GB); Guy Adams, Bristol (GB); Steven J. Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 799 days.

(21) Appl. No.: 16/473,463

(22) PCT Filed: Apr. 26, 2017

(86) PCT No.: PCT/US2017/029690
§ 371 (c)(1),
(2) Date: Jun. 25, 2019

(87) PCT Pub. No.: WO2018/199947
PCT Pub. Date: Nov. 1, 2018

(65) Prior Publication Data

US 2020/0039075 A1 Feb. 6, 2020

(51) Int. Cl.
*B25J 9/16* (2006.01)
*G01B 5/008* (2006.01)
*G01B 21/04* (2006.01)

(52) U.S. Cl.
CPC ............ *B25J 9/1692* (2013.01); *G01B 5/008* (2013.01); *G01B 21/042* (2013.01)

(58) Field of Classification Search
CPC ............................. G01B 21/042; B25J 9/1692
USPC ........................................................ 700/254
See application file for complete search history.

(56) References Cited

U.S. PATENT DOCUMENTS 6,519,860 B1 2/2003 Bieg et al.
7,904,202 B2 3/2011 Hoppe
8,290,618 B2 10/2012 Demopoulos
8,457,790 B2 6/2013 Blondel et al.
(Continued)

FOREIGN PATENT DOCUMENTS

RU 2605393 C2 12/2016
WO WO-2014060516 A1 4/2014

OTHER PUBLICATIONS

Cong, D et al., Kinematic Calibration of Parallel Robots Using Cmm, Jun. 21-23, 2006,< http://ieeexplore.ieee.org/document/1713640/ >.

*Primary Examiner* — Ricky Go
(74) *Attorney, Agent, or Firm* — Michael Dryja

(57) ABSTRACT

A method comprises moving a robotic structure to a first pose such that an end-effector of the robotic structure has an absolute position comprising an absolute location and absolute orientation. The method comprises providing a calibration artefact on the end-effector. The method comprises determining at least three planes coinciding with at least three respective surface planes of the calibration artefact, by measuring absolute locations of a plurality of points on the calibration artefact. The method comprises determining the absolute location and absolute orientation of the end-effector, when the robotic structure is in the position based on the determined at least three planes. The method also comprises calibrating the first pose of the robotic structure using the determined absolute location and absolute orientation of the end-effector.

14 Claims, 8 Drawing Sheets

(56) References Cited

U.S. PATENT DOCUMENTS

| | | | | |
|---|---|---|---|---|
| 9,669,545 | B2 * | 6/2017 | Suzuki | B25J 9/1692 |
| 2009/0157226 | A1 | 6/2009 | Smet | |
| 2013/0096718 | A1 * | 4/2013 | Friedman | B25J 9/1692 700/254 |
| 2014/0018957 | A1 * | 1/2014 | Matsumoto | B25J 9/1692 700/251 |
| 2014/0229005 | A1 * | 8/2014 | Suzuki | B25J 9/1692 700/254 |
| 2015/0025683 | A1 * | 1/2015 | Amano | B25J 9/1692 700/254 |
| 2015/0266183 | A1 * | 9/2015 | Alifragkis | B25J 9/1692 700/254 |
| 2016/0039094 | A1 * | 2/2016 | Lundberg | B25J 9/1692 700/251 |
| 2016/0039096 | A1 * | 2/2016 | Wallack | G06T 7/80 901/9 |
| 2017/0291302 | A1 * | 10/2017 | Huang | B25J 9/1692 |
| 2018/0222055 | A1 * | 8/2018 | Wang | B25J 9/1692 |

* cited by examiner

ROBOTIC STRUCTURE CALIBRATIONS

BACKGROUND

The use of robotic mechanisms, is mainly encountered when the tasks to be executed request high accuracy and repeatability, e.g. automated assembly, robotic surgery, handling of hazardous materials, etc. In order to meet the requested high accuracy and repeatability, appropriate measures may be taken during the manufacturing and operation of the robotic system.

BRIEF DESCRIPTION OF DRAWINGS

Examples will now be described, by way of non-limiting example, with reference to the accompanying drawings, in which.

DETAILED DESCRIPTION

For robotic structures phenomena such as accuracy and repeatability of sensing system, steady-state performance of the low-level controller at standstill, and structural flexibilities may be taken into account when designing the structure. In some examples, they may be minimized. In some examples, one of accuracy or repeatability may be minimized at the expense of the other. For example, if the robotic structure is intended for use in a mass production line, repeatability will take precedence over accuracy. However, if the parts are being custom made, then accuracy would be more central.

To provide continuous tracking of complex paths, improved position accuracy as well as repeatability is beneficial. Repeatability allows a position of a robotic structure to repeat a movement to a particular position, but this does not imply any accuracy of the absolute position which is being repeated. High accuracy is in order to prevent potential collisions when automatically (e.g. programmatically) interacting at close proximity with any object in an unknown orientation where typically teach pendent or other prior correction is not applicable. If a pathway to an intended location involves moving around obstructions, an accurate trajectory is involved as well as an accurate endpoint.

In order to provide a high accuracy of the position of the robotic structure, the precise position, i.e. location and orientation, of the structure needs to be accurate. To do this, the pose of the robotic structure may be calibrated using measurements of the location and orientation of an end-effector of the robotic structure.

Figure 1:
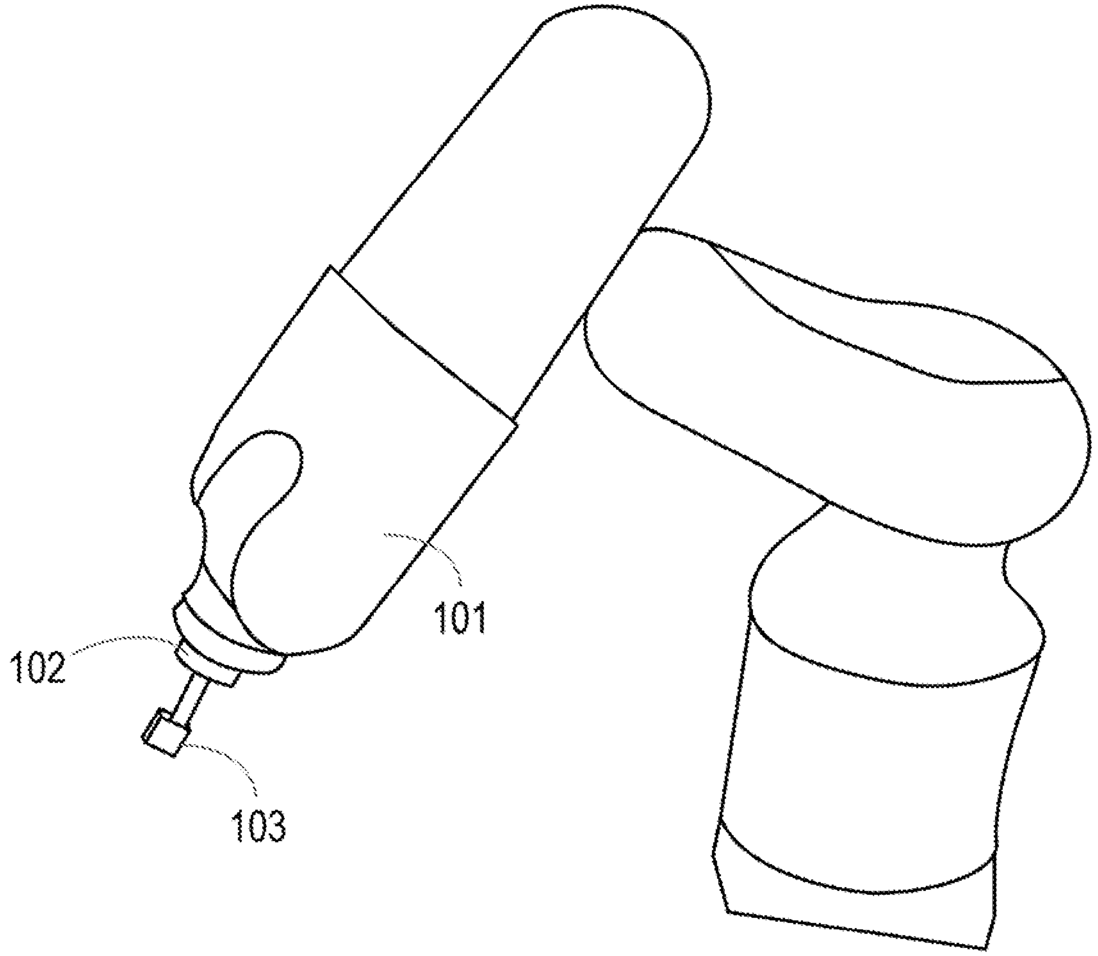
FIG. 1 is an example of a robotic structure and a calibration artefact.

FIG. 1 illustrates an example of a robotic structure. In this example the robotic structure comprises an arm 101 and an end-effector 102, where the end-effector is the device or tool that is connected to the end of the robot arm where the hand would otherwise be. The end-effector 102 is the part of the robot arm 101 that interacts with the external environment and, therefore, the pose of the robotic structure which places the end-effector in a specific absolute position may benefit from precise calibration. A precise description of the size and/or dimensions of the end-effector would also be beneficial.

A calibration artefact 103 is connected to the end-effector 102. In this example, the calibration artefact 103 is a cube. It is noted, however, that other shapes of calibration artefact may be utilised in order to measure the location and orientation of the end-effector.

In some examples, measurements are taken to determine the location and orientation of the calibration artefact separately; for example, by using lasers to determine the position of the calibration artefact and using some form of visual device to determine the orientation of the cube.

In other examples, the location and orientation of the calibration artefact can be determined using location information without any orientation specific information. This allows for a reduction in the cost and complexity of the calibration system.

In order to control the position of the robotic structure, an adequate description of the pose of the robotic structure may be derived. The following equations may be implemented by a processor performing calibration. In some examples, the position of the end-effector, or in some examples the position of any point along the robotic structure may be described by a column vector $p=[x, y, z, \phi, \theta, \varphi]^T \in R^{6\times1}$, where x, y and z describe the position in Cartesian space and $\phi$, $\theta$ and $\varphi$ are the Euler angles describing the orientation. In some examples, if the orientation is zeroed the column vector may describe any point on the robotic structure, as each point has a location and an orientation but not all of these can necessarily be controlled as the number of degrees of freedom defines the number of the entries of the column vector that can be controlled. The number of joints of an articulated robotic mechanism defines its degrees of freedom. The total number of degrees of freedom is equal to the number of independent parameters that define its configuration. For example, for a robotic structure having 6 degrees of freedom, i.e. an arm having the last 3 joints intersecting at a single point, the first 3 joints determine the position of the end-effector, and the other 3 joints determine the orientation.

In order to describe the kinematic relationship of the robotic structure, i.e. to define the function that determines the positional vector of the end-effector given the values of the joint variables, the modified Denavit-Hartenberg (DH) notation may be used. In this notation, each link can be described using two parameters to describe the geometric parameters of the link itself, and two parameters to describe the relationship of the link to its neighbouring links.

Forward kinematics (FK) refers to the use of the kinematic equations of a robotic structure to compute the position of the end-effector of that structure, or the position of any other point along the robotic structure, from the specific values of the joint parameters. Therefore, by knowing the joint parameters and the kinematic equations, the position of the end-effector can be derived. The following equations may be implemented by a processor performing calibration. Each link is associated with its own joint space which relates with Cartesian space by:

$$p=f(q), f: R^n \rightarrow R^m, \text{ where}$$

n denotes the number of degrees of freedom and m the dimension of the Cartesian space. The position of a coordinate system assigned to a specific link i may be described with respect to the coordinate system of the previous links i−1 by the following transformation matrix:

$$ {}^{i}_{i-1}T = \begin{pmatrix} \cos(\theta_i) & -\sin(\theta_i) & 0 & \alpha_i - 1 \\ \sin(\theta_i)\cos(a_i - 1) & \cos(\theta_i)\cos(a_i - 1) & -\sin(a_i - 1) & -\sin(a_i - 1)d_i \\ \sin(\theta_i)\sin(a_i - 1) & \cos(\theta_i)\sin(a_i - 1) & \cos(a_i - 1) & \cos(a_i - 1)d_i \\ 0 & 0 & 0 & 1 \end{pmatrix} $$

where $a_i$ is the link length of the link i, $\alpha_i$ is the link twist, $d_i$ is the link offset, and $\theta_i$ is the joint angle of the Denavit-Hartenberg (DH) parameters. The transformation matrix above can be written as:

$$ {}^{i}_{i-1}T = \begin{pmatrix} R_{3\times 3} & p_{3,1} \\ O_{1,3} & 1 \end{pmatrix}, $$

where $p_{3,1}$ is a column vector that describes the position of the coordinate system i with respect to the coordinate system i−1, $O_{1,3}$ is a 3 by 1 zero matrix, and $R_{3\times 3}$ is a direction cosine matrix that describes the orientation of the coordinate system of the link i with respect to the coordinate system of the link i−1.

For a robotic structure having n joints, we may describe the position of the end-effector with respect to an inertial coordinate system attached at the base of the system as the product of successive transformation matrices from link 1 through to link n. Therefore, for a robotic structure with n degrees of freedom:

$$ {}^{n}_{0}T = \prod_{i=1}^{n} {}^{i}_{i-1}T. $$

In some examples, a robotic structure having the following uncalibrated DH parameters is used:

TABLE 1

| Link | $a_i$ (m) | $d_i$ (m) | $\alpha_i$ (radians) | $\theta_i$ (radians) |
|---|---|---|---|---|
| 1 | 0 | 0.125 | 0 | $q_1$ |
| 2 | 0 | 0 | −π/2 | $q_2$ − pi/2 |
| 3 | 0.210 | 0 | 0 | $q_3$ |
| 4 | 0.075 | 0.210 | −π/2 | $q_4$ |
| 5 | 0 | 0 | π/2 | $q_5$ |
| 6 | 0 | 0.07 | −π/2 | $q_6$ |

The inverse kinematic problem for a particular robotic structure relates the position of an end-effector to the joint parameters for that particular robotic structure. A particular set of joint parameters describes a particular pose of the robotic structure. The inverse kinematic problem may therefore be different for different types of robotic structures having differing numbers of joints and links.

Figure 2A:
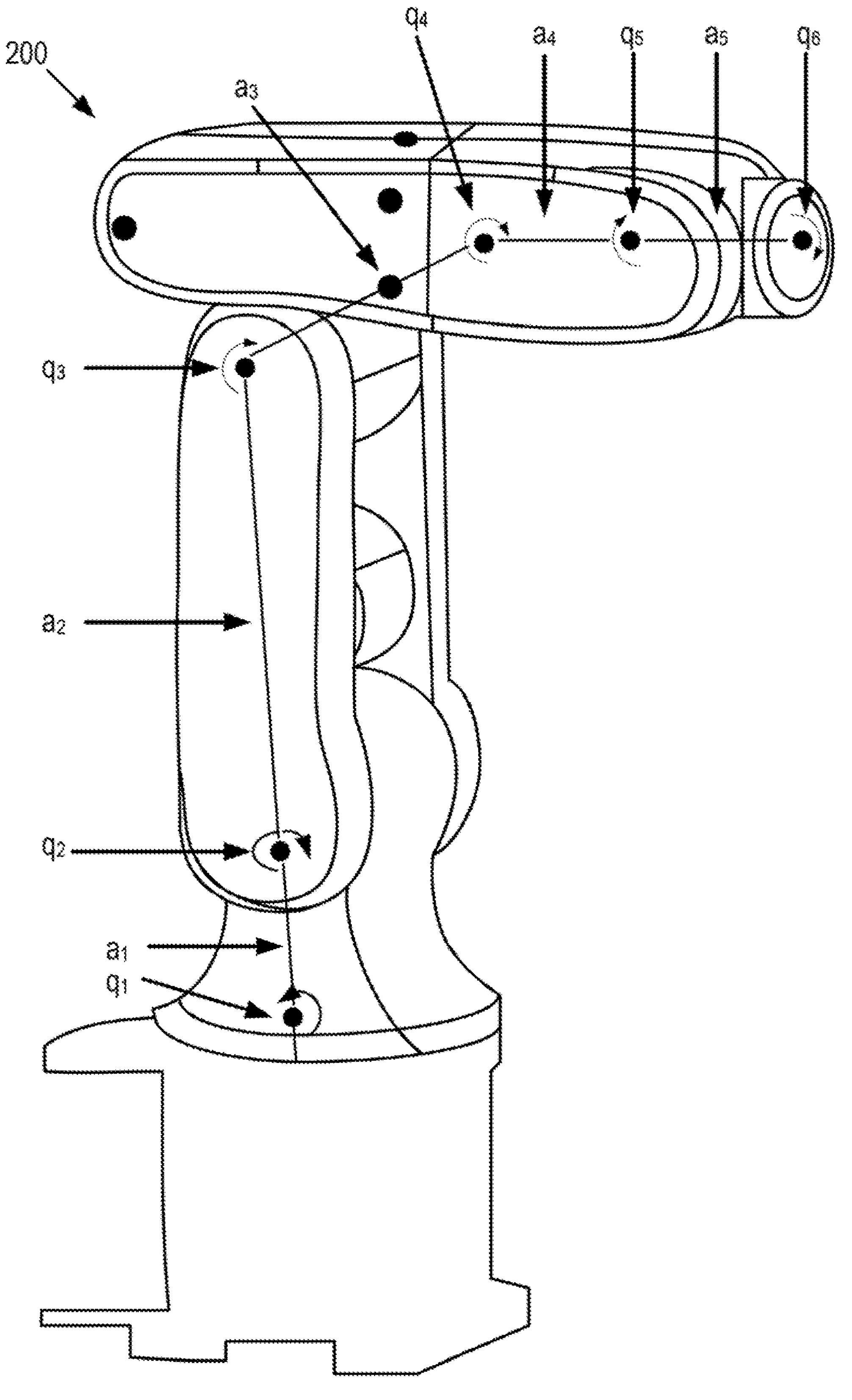
FIG. 2*a* is an example of a robotic structure having six joints.
Figure 2B:
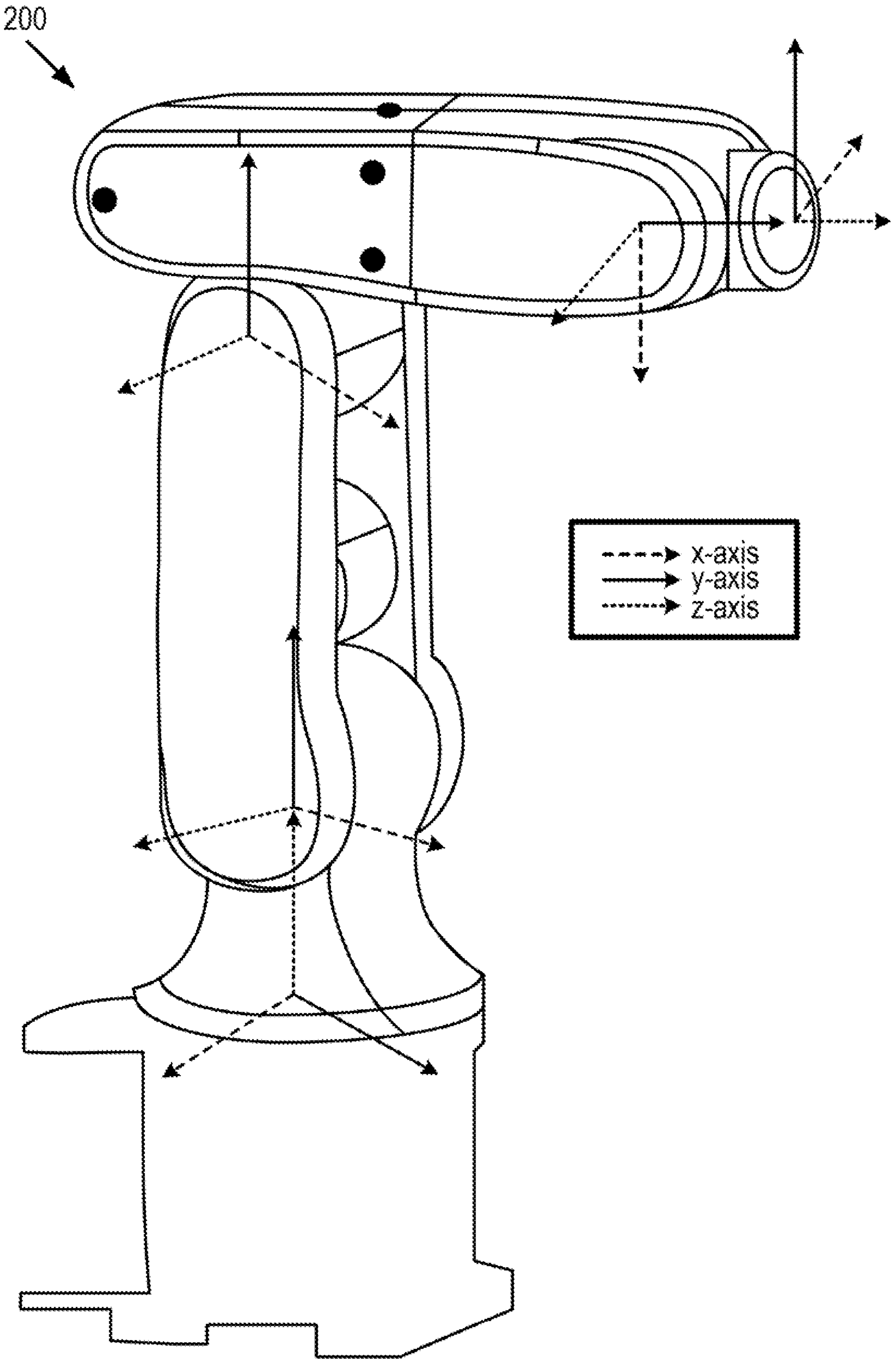
FIG. 2*b* illustrates the coordinate systems for the joints of the robotic structure of FIG. 2*a;*
Figure 2C:
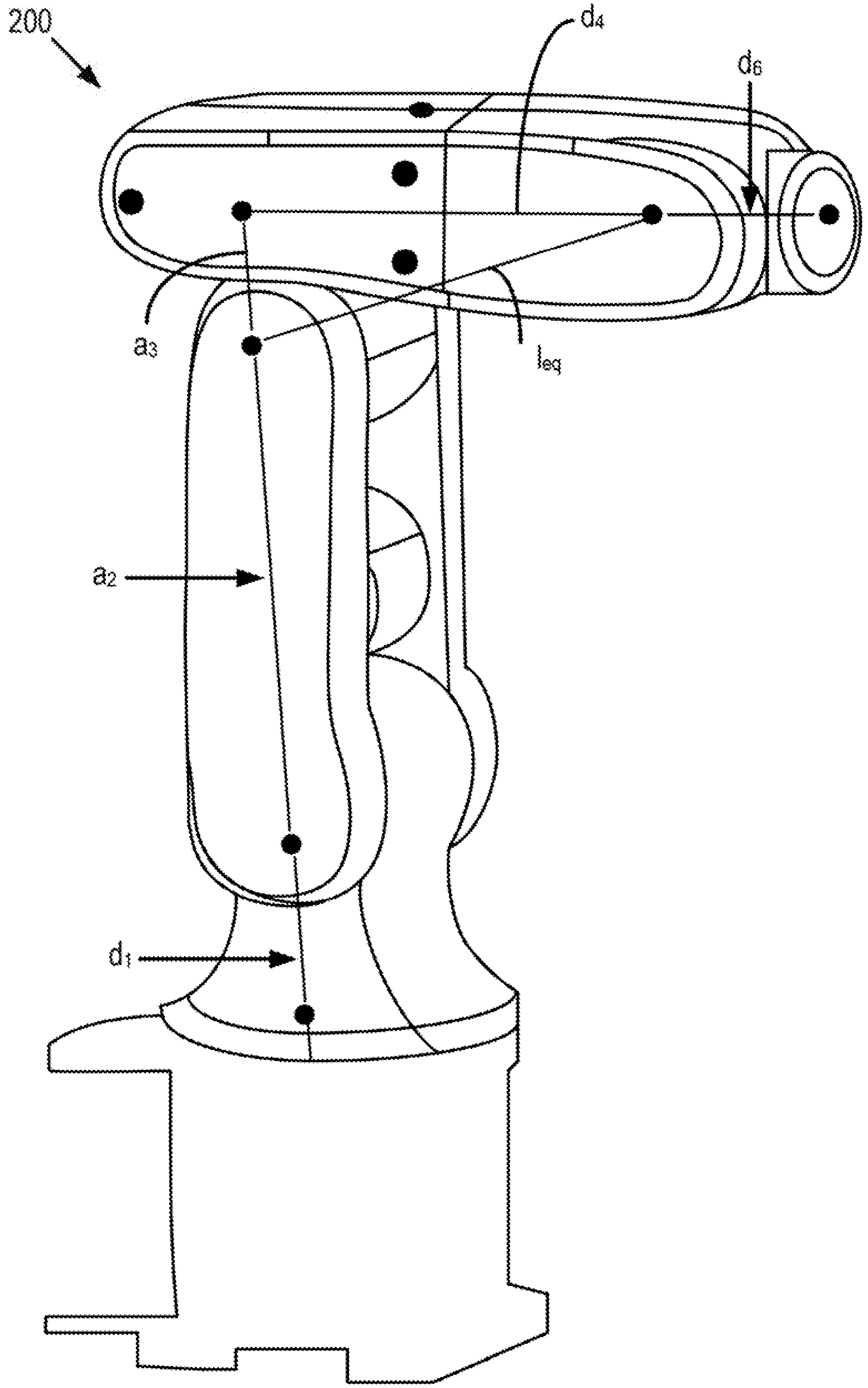
FIG. 2*c* illustrates the link lengths of the robotic structure of FIG. 2*a;*

FIGS. 2*a*, 2*b* and 2*c* illustrate a robotic arm 200 having 6 joints. The link lengths $a_1$ to $a_5$, and joint angles $q_1$ to $q_6$ are shown in FIG. 2*a*. In FIG. 2*b* the coordinate system for each link is shown. The robotic arm 200 has the parameters shown in table 1.

The following is an example of an inverse kinematic problem for the robotic arm 200 having 6 joints.

The links 4 and 5 may be assumed to have a common coordinate system which is located at link 5, or the wrist, i.e. $p_{wrist} \in R^{3\times 1}$ as can be seen in FIG. 2*b*. Secondly the link length $a_3$ and link offset $d_4$ can be combined into a single virtual link of length $l_{eq}=\sqrt{a_3^2+d_4^2}$, from joint 3 to the wrist, this virtual link length is shown in FIG. 2*c*. The following equation relates the position of the end effector relative to the position of the wrist:

$$ {}_{0}^{6}p = p_{wrist} + d_6 {}_{0}^{6}R, \text{ where} $$

${}_{0}^{6}p \in R^{3\times 1}$ is the vector that describes the position of the coordinate system attached at the end-effector with respect to the coordinate system attached at the base, ${}_{0}^{6}R \in R^{3\times 3}$ is the rotation matrix that describes the orientation of the end-effector and $d_6$ is the offset of the last link in the kinematic chain. The following equations may be implemented by a processor performing calibration. The joint angles $q_1$, $q_2$ and $q_3$ can now be derived directly from the wrist according to the two link system shown in FIGS. 2*a*, 2*b* and 2*c*, using simple trigonometry:

$$ q_1 = a\tan 2(p^y_{wrist}, p^x_{wrist}), $$

$$ q_2 = \text{gamma} + \text{beta} - \text{pi}/2 \text{ where} $$

$$ \text{gamma} = a\cos\left(\frac{(a_2^2 - l_{eq}^2 + c^2)}{2ca_2}\right), $$

$$ \text{beta} = a\tan 2(r, p^z_{wrist}), $$

$$ c = \sqrt{r^2 + {p^z_{wrist}}^2}, \text{ and} $$

$$ r = \sqrt{{p^x_{wrist}}^2 + {p^y_{wrist}}^2} $$

$$ \text{and } q_3 = a\cos\left(\frac{(a_2^2 + l_{eq}^2 - c^2)}{2l_{eq}a_2}\right) + a\tan 2(a_3, d_4) + \text{pi}/2. $$

Given the value of the joints $q_1$, $q_2$ and $q_3$ the location of the wrist can be uniquely defined. The location can be extracted from the first three elements of the fourth column of the following transformation matrix ${}_{0}^{3}T={}_{0}^{1}T_1{}^{2}T_2{}^{3}T$. In order to describe the orientation the transformation matrix that relates the coordinate system attached at the end-effector with the coordinate system attached at the wrist would be derived. This matrix is defined as ${}_{3}^{6}T=({}_{0}^{3}T)^{-3}{}_{+0}{}^{6}T$. The 3x3 direction cosine matrix, ${}_{3}^{6}T$, defined in the upper left corner of the transformation matrix may then be utilised to solve for $q_4$, $q_5$ and $q_6$. In this example, it is assumed that path planning has been conducted already, or has been extracted from a CAD file, or a look-ahead and correct procedure is adopted. Once the path is available, the inverse kinematics solution may be invoked along each point on the path and the robot structure may be accurately positioned. The trajectory of the robot structure, i.e. the joint angles (with the values provided by the inverse kinematics solution), may therefore modified in order to achieve error reduction along a predefined path.

According to the coordinate system that was assigned on each of the last three links, see FIG. 2*b*, it is natural to choose the XYZ Euler angle convention in order to describe the orientation of the end-effector. The following equations may be implemented by a processor performing calibration. Thus, it may be concluded that:

$$\theta = a\tan 2\left(\sqrt{{}^{6}_{3}T(3,1)^2 + {}^{6}_{3}T(3,2)^2},\ {}^{6}_{3}T(3,3)\right),$$

$$\phi = a\tan 2\left(\frac{{}^{6}_{3}T(2,3)}{\sin(\theta)},\ \frac{{}^{6}_{3}T(1,3)}{\sin(\theta)}\right), \text{ and}$$

$$\varphi = a\tan 2\left(\frac{{}^{6}_{3}T(3,2)}{\sin(\theta)},\ -\frac{{}^{6}_{3}T(3,1)}{\sin(\theta)}\right).$$

The remaining angles are then defined as follows: $q_4=\phi$, $q_5=\theta$ and $q_6=\varphi$. It is noted that the inverse kinetics problem for a robotic structure having six degrees of freedom exhibits multiple solutions. However, it would be clear when multiple solutions might appear and how the corresponding equation would be modified.

Figure 3:
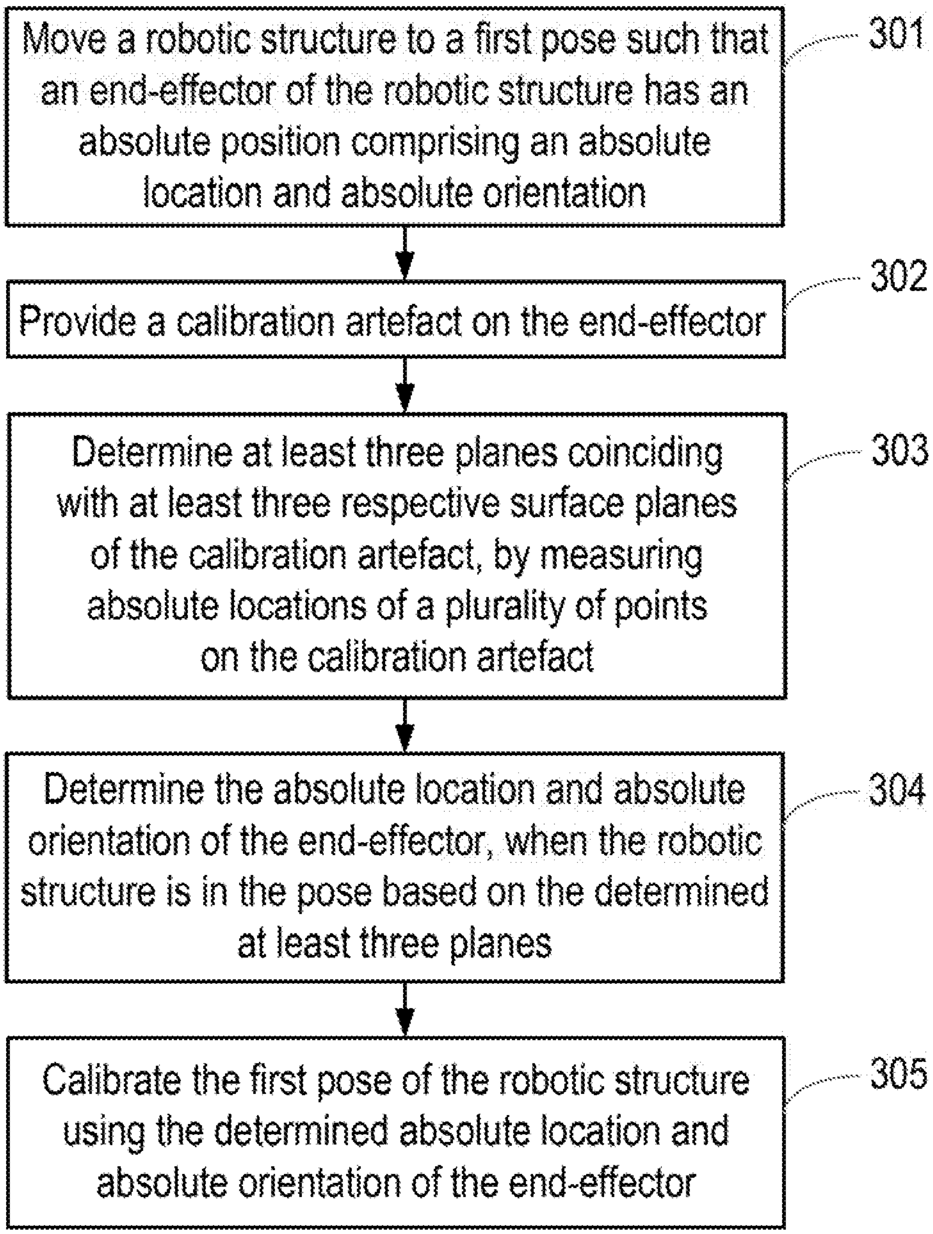
FIG. 3 is an example of a method, which may be a method of calibrating a robotic structure.

FIG. 3 is an example of a method, which may be a method of calibrating a robotic structure, and which may be computer implemented. In some examples, the method of FIG. 3 may be performed by a calibration apparatus. The method comprises, in block 301 moving a robotic structure, such as the robotic arm 200, to a pose such that an end-effector of the robotic structure has an absolute position comprising an absolute location and absolute orientation. The pose of the robotic structure may be described, for example, by nominal DH parameters.

The pose of the robotic structure may then be calibrated using a calibrating apparatus.

In some examples, multiple poses are used during the calibration. For example, the robotic structure may be used to drive the end-effector to a number of different positions in space, for example 50 different positions, using different poses selected from a sinusoidal variation of the joint angles with an amplitude of 25 degrees. In order to produce a pseudo-random distribution for these positions, the period of the sinusoidal variation may be changed for each of the joints. It is noted that a larger number of positions and/or larger sinusoidal amplitudes measured may provide more accurate calibration of the joint parameters for the poses.

In block 302 the method comprises providing a calibration artefact on the end-effector of the robotic structure. In this example, the calibration artefact is a cube. It is noted that other shapes of artefact may be used, for example a pyramidal shape.

The calibration artefact may be produced utilizing high precision; for example, using five axis computer numerical control (CNC) machining that results in a dimensional accuracy in the range of 3 um after tool offsets have been taken into account from the first artefact. The dimensional accuracy needed depends on the scale of the robotic structure and may be low enough so as not to significantly contribute to the accuracy of the measured position. In order to ensure that there is minimal misalignment between the calibration artefact and the robot end-effector during remounting, a dowel pin may be used. The calibration artefact may therefore be provided a predetermined distance from the end-effector. In some examples, there may be a predetermined relationship between a point of the calibration artefact; for example, a corner of the cube, and the end-effector.

In this example, measurements of the calibration artefact are made whilst the calibration artefact is in each different position. In some examples, a plurality of measurements of absolute locations on the surface of the calibration artefact are made. In some examples, measurements are made of at least three points on each of at least three faces of the calibration artefact. It is noted that more measurements may be made for redundancy.

In some examples, the measurements of the calibration artefact are made using a 5-axis CMM (coordinate measuring machine). This machine provides high precision measurements. In addition, such a CMM need not be repositioned like optical systems which may inherently suffer from occlusions and therefore need to be repositioned. This introduces re-referencing and/or calibration errors.

These measured points may, in some examples, be used in the determination of block 303. In block 303, the method comprises determining at least three planes, coinciding with at least three respective surface planes of the calibration artefact. In other words, in some examples the method comprises determining from the plurality of points at least three equations representing the absolute positions of at least three faces of the calibration artefact. In other words, the method of block 303 may comprise determining at least three equations representing the absolute positions of at least three faces of the calibration artefact, wherein the relationship between the at least three faces of the calibration artefact is predetermined.

Figure 4:
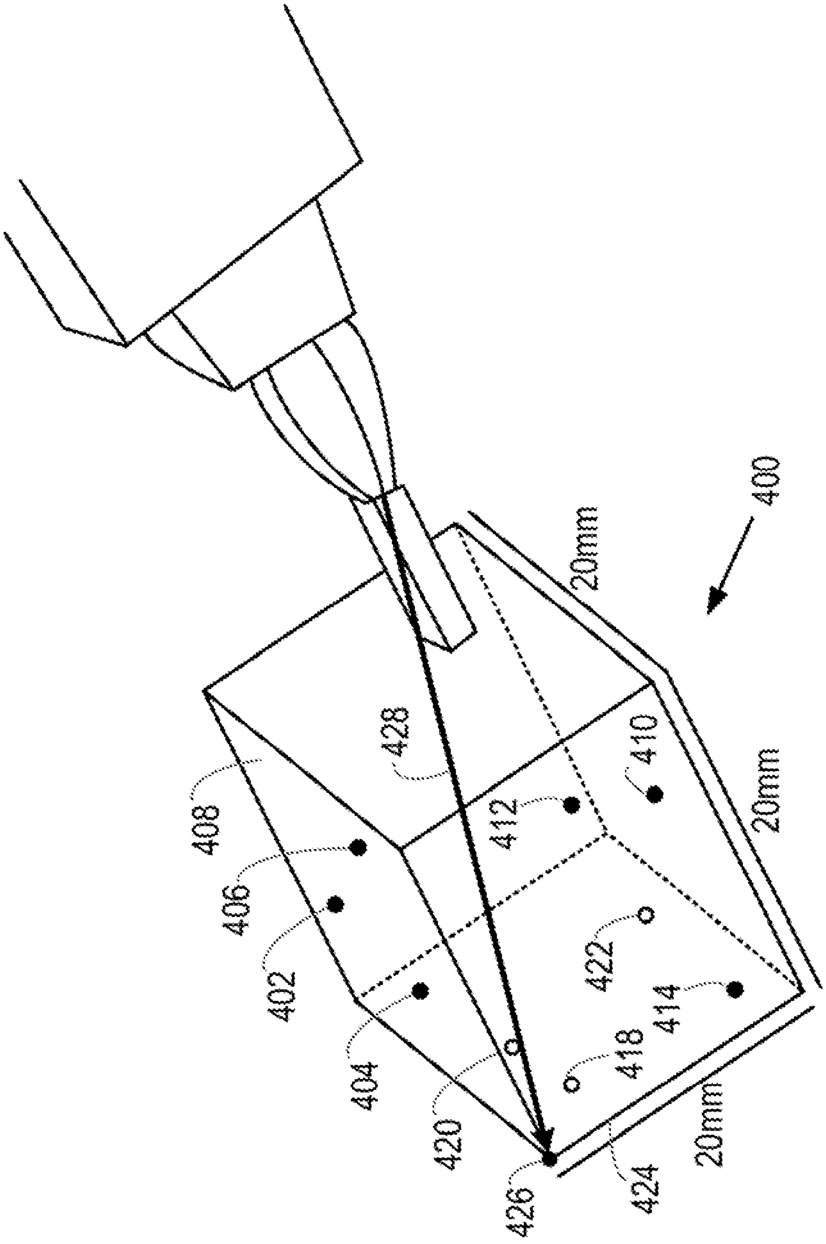
FIG. 4 is an example of a calibration artefact.

In the example of FIG. 1 the calibration artefact is a cube. This cube is shown in more detail in FIG. 4. In this example, the cube is 20 mm×20 mm×20 mm. In this example, the cube is attached to the end-effector by a cylinder of length 40 mm. Please note that, for clarity, FIG. 4 is not drawn to scale. However, it is noted that the choice of the size of calibration artefact is arbitrary, and that any size of calibration artefact may be used. The calibrations artefact 400 in FIG. 4 shows the 3 points 402, 404 and 406 on a first face 408.

The measurement of these three points 402, 404 and 406, may be used to determine the equation for the plane which corresponds to the first face 408. The equation for a plane, π, can be generally given by π:Ax+By+Cz=D), where (A,B, C) is the vector normal to the plane and D is a constant. The cross product of two vectors lying within a plane give the vector normal to the plane, therefore the cross product of the vector between any two of the points 402, 404 and 406, and the vector between any other two of the points 402, 404 and 406 will give the normal to the plane, and hence the equation for the plane.

Three other points 410, 412 and 414 are shown on a second face 416 of the cube 400, and three further points 418, 420 and 422 are shown on a third face 424 of the cube 400. The equations for the planes which correspond to the second and third faces can be calculated in a similar way to as described for the first face 408.

Returning to FIG. 3, in block 304 the method comprises determining the absolute location and absolute orientation of the end-effector, when the robotic structure is in a first pose, based on the determined at least three planes. In other words, determining the absolute location and absolute orientation of the end-effector, when the robotic structure is in the first pose, from the determined at least three equations.

In one example, the determination of the absolute location of the end-effector may be made by calculating a point of intersection of the planes and determining the location of the end-effector from the point of intersection and a predetermined relationship between the point of intersection and the end-effector.

In the example of FIG. 4, the point of intersection of the three planes is the top left corner of the cube 426. The relationship between the point of intersection 426 and the end-effector is given by the vector 428.

The vector 428 can be given by, in this example, $[60, 10, 10]^T$ from the coordinate system of the end-effector. This is vector is calculated from the specific dimensions of the cube 426 in the example of FIG. 4.

The absolute location of the end-effector can be calculated using the following equation, which may be implemented by a processor performing calibration:

$$p_{actual} = p_{nominal} + R\begin{bmatrix} 60 \\ 10 \\ 10 \end{bmatrix},$$

In the above relationship $p_{actual}$ is the measured location, or absolute location, of the end-effector. Given the joint angles that were used in order to calculate the pose of the robotic arm for the particular position of the end-effector, the nominal end-effector position denoted as $p_{nominal}$ can be calculated, for example using the nominal DH parameters.

As discussed with respect to FIG. 4, the normal vectors to the three planes can be calculated using the cross product of the vectors defined between the three points on each face. Then, determining of the absolute location and absolute orientation of the end-effector may comprise calculating the normal vector for each of the at least three planes and creating a matrix, $R_{3\times3}$, of the normal vectors. The matrix $R_{3\times3}$, may be a direction cosine matrix.

Determining the absolute orientation of the end-effector may then comprise calculating the Euler angles, θ, ϕ, and φ, of the orientation by solving an inverse kinematic problem for the robotic structure, wherein the inverse kinematic problem relates the matrix $R_{3\times3}$ to the Euler angles.

For the example of FIG. 4 for the normal vector for each of the three surfaces of the calibration artefact can then be used to populate $R_{3\times3}$, such that:

$$R_{3\times3} = \begin{bmatrix} N_{424}^x & N_{408}^x & N_{416}^x \\ N_{424}^y & N_{408}^y & N_{416}^y \\ N_{424}^z & N_{408}^z & N_{416}^z \end{bmatrix}$$

where $[N_{408}^x, N_{408}^y, N_{408}^z]$ is the normal to the plane 408, $[N_{416}^x, N_{416}^y, N_{416}^z]$ is the normal to the plane 416, and $[N_{424}^x, N_{424}^y, N_{424}^z]$ is the normal to the plane 424.

The matrix $R_{3\times3}$ describes the orientation of the cube. This can be inserted into the transformation matrix $${}^{i}_{i-1}T = \begin{pmatrix} R_{3\times3} & p_{3,1} \\ O_{1,3} & 1 \end{pmatrix},$$

which can then be used to solve the inverse kinematics problem as described for the robotic structure of FIGS. 2*a*, 2*b* and 2*c*.

It is noted that equations for planes can be determined for any shape of artefact having flat faces. The relationship between the faces will be different to that of a cube, but as the relationship between them would still be a predetermined relationship, it may still be used to determine the orientation of the calibration artefact and hence the end-effector.

Returning again to FIG. 3, in block 306 the method comprises calibrating the pose of the robotic structure using the determined absolute location and absolute orientation of the end-effector. For example, the values of the DH parameters may be calibrated. For example, to calibrate the pose of the robotic structure a minimization may be applied to a forward kinematic function of the robotic structure, wherein the forward kinematic function relates the absolute position of the end effector to joint parameters which describe the pose of the robotic structure.

In some examples, the calibration of the parameters of the kinematic model can be performed by a minimization technique. The minimization technique is used to provide identified calibrated DH parameters for the robotic structure. In the particular example for the robotic structure of FIGS. 2*a*, 2*b* and 2*c*, and the kinematic model described above, the below equation for minimization can be used as the first optimization problem, which may be implemented by a processor performing calibration:

$$\min_x \|f(x, q) - p_{actual}\|,\ x \in R^{18xn},$$

where $f(x,q) \in R^{18\times n}$ denotes the forward kinematics function that is used to calculate the location and orientation of the robotic structures end-effector given the recorded joint values and the DH parameters. The position of the end-effector, or in some examples the position of any other point of the robotic structure is contained in the vector $p_{actual} \in R^{6\times n}$. The joint angles of the robotic structure are contained in the vector $q \in R^{6\times n}$, where n is the number of measurements in different poses of the robotic structure, i.e. different positions of the end-effector. For example there may be measurements of 50 different poses. Finally $x \in R^{18\times1}$ is the vector containing the optimization variables, i.e. the DH parameters corresponding to the values $a_i$, $d_i$ and $a_i$. The first optimization problem described in the minimization equation above is a multi-objective optimization problem. Therefore, an appropriate approach may be adopted. The minimization of the error between the calculated and measured end-effector positions may be obtained using the x and y coordinates of the end-effector location in Cartesian coordinates.

The first optimization problem may then be reformulated as follows:

$$\min_x (w_1 \cdot \|f_x(x, q) - p_{actual}^x\| + w_2\|f_y(x, q) - p_{actual}^y\|,$$

where $w_1$ and $w_2$ are the chosen weights, $f_x(x,q)$ and $f_y(x,q)$ denote the calculated x and y locations respectively and $p_{actual}^x$ and $p_{actual}^y$ are the measured positions. The weights $w_1$ and $w_2$ could be even or biased towards the inverse error. In general the weightings may be proportional to accuracy or a function of accuracy, inversely proportional to error rate or a function of error rate, and combinations thereof.

An estimation of the DH parameters for the robotic structure of FIGS. 2*a*, 2*b* and 2*c*, could be derived from this reformulation of the optimization problem. However, the parameter $d_1$ may not be determined from the reformulation of the first optimization problem as the parameter $d_1$ is not related to the definition of the x and y coordinates.

In some examples, therefore, to calibrate the pose of the robotic structure a first optimization problem is solved for the x and y coordinates of the absolute position of the end effector, and a second optimization problem is solved for the z coordinates of the absolute position of the end effector.

A separate second optimization problem, which may be implemented by a processor performing calibration using the following minimization equation related to the z coordinate may therefore be used to find $d_1$:

$$\min_{d_1} \| f_z(x_1, d_1, q) - p^z_{actual} \|,$$

where $x_1$ are the identified DH parameters identified during the first optimization problem.

In some examples, therefore, a two phase optimization problem comprising a first phase to minimize the error in the x and y coordinates and a second phase to minimize the error in the z coordinates is used.

Applying this minimization technique to the robotic structure of FIGS. 2*a*, 2*b* and 2*c*, over 50 calibration points the following identified DH parameters of Table 2 were obtained.

TABLE 2

| Link | $a_i$(m) | $d_i$(m) | $\alpha_i$(radians) | $\theta_i$(radians) |
|---|---|---|---|---|
| 1 | −0.0001 | 0.1272 | $-3.351e^{-4}$ | $q_1$ |
| 2 | −0.0003 | −0.0001 | −1.5702 | $q_2$ − pi/2 |
| 3 | 0.2101 | −0.0002 | $6.6672e^{-4}$ | $q_3$ |
| 4 | 0.0733 | 0.2109 | −1.5742 | $q_4$ |
| 5 | 0.0004 | 0 | 1.5609 | $q_5$ |
| 6 | −0.0004 | 0.0699 | −1.511 | $q_6$ |

Applying the identified DH parameters in the inverse kinematics computation obtains the calibrated absolute position, i.e. location and orientation, of the end-effector. This calibration reduces macroscopic error contributors, i.e. systematic errors due to manufacturing and assembly tolerances. In addition to the reduced variance in the error, this calibration also centres the errors at zero for each coordinate axis.

The calibration of the DH parameters allows the user of the robotic structure, in some examples, to selectively switch between accuracy and repeatability. For example, the robotic structure may comprise a repeatability calibration that is capable of repeatability of particular motions, for example a motion planning library. Therefore, for a movement where repeatability is of interest, but not accuracy, the robotic structure may be placed into a mode where it utilises its own repeatability calibration, e.g motion planning library. However, if accuracy of movement is requested, then the calibrated DH parameters can be invoked and the inverse kinematic problem solved.

Figure 5:
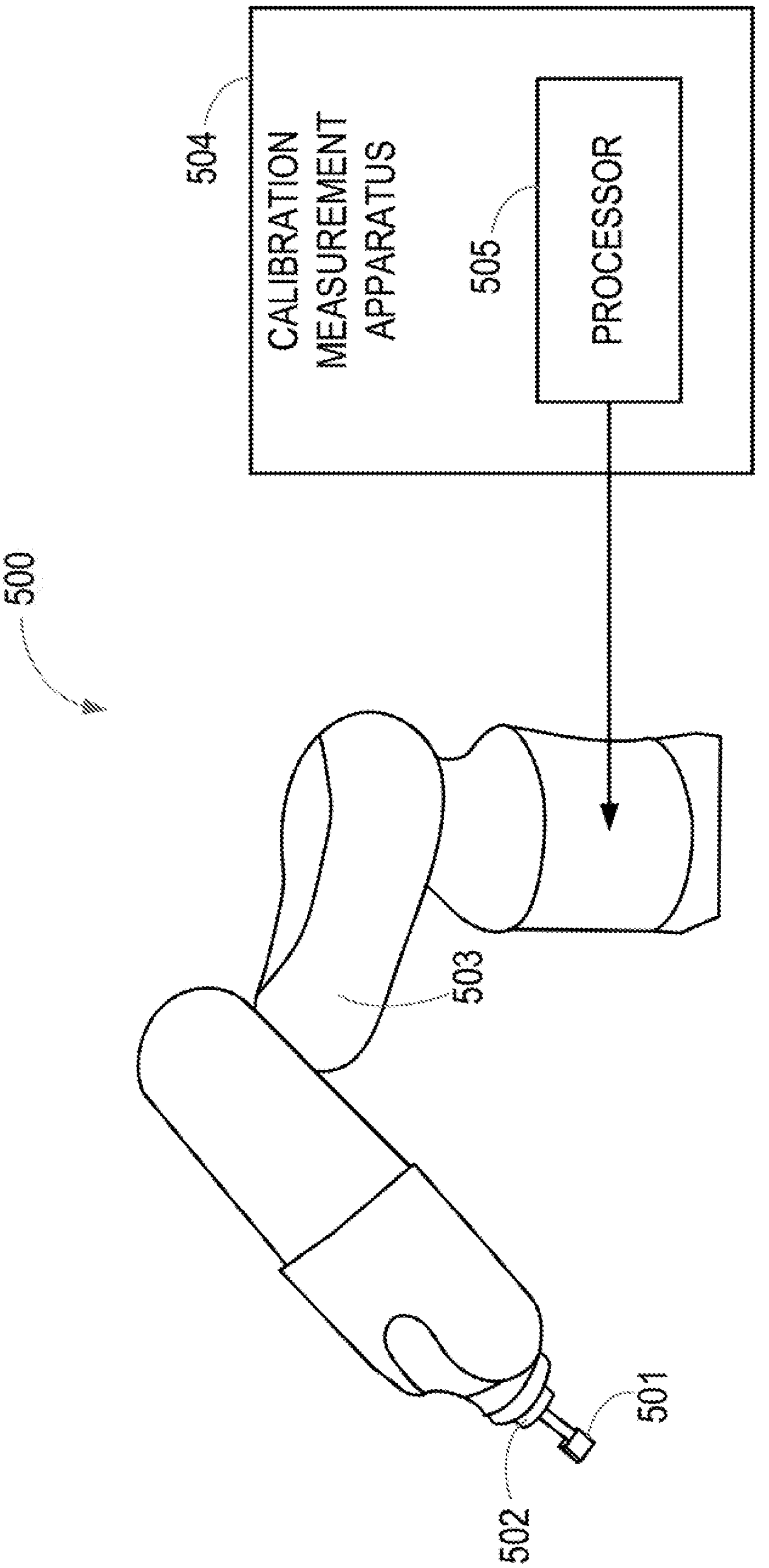
FIG. 5 is an example of a calibration apparatus.

FIG. 5 illustrates an example of a calibration apparatus 500. The calibration apparatus 500 comprises a calibration artefact 501 provided on an end-effector 502 of a robotic structure 503.

The calibration apparatus further comprises a calibration measurement apparatus 504 comprising a processor 505 to move the robotic structure 503 to a pose such that the end-effector 502 of the robotic structure 503 has an absolute position comprising an absolute location and absolute orientation. The processor 505 measures absolute locations for a plurality of points on a surface of the calibration artefact 501 and determines from the plurality of points at least three equations representing the absolute positions of at least three faces of the calibration artefact 501. The processor 505 may also be to determine the absolute location and absolute orientation of the end-effector 502, when the robotic structure is in the pose, from the determined at least three equations, and can calibrate the pose of the robotic structure 503 using the determined absolute location and absolute orientation of the end-effector.

Figure 6:
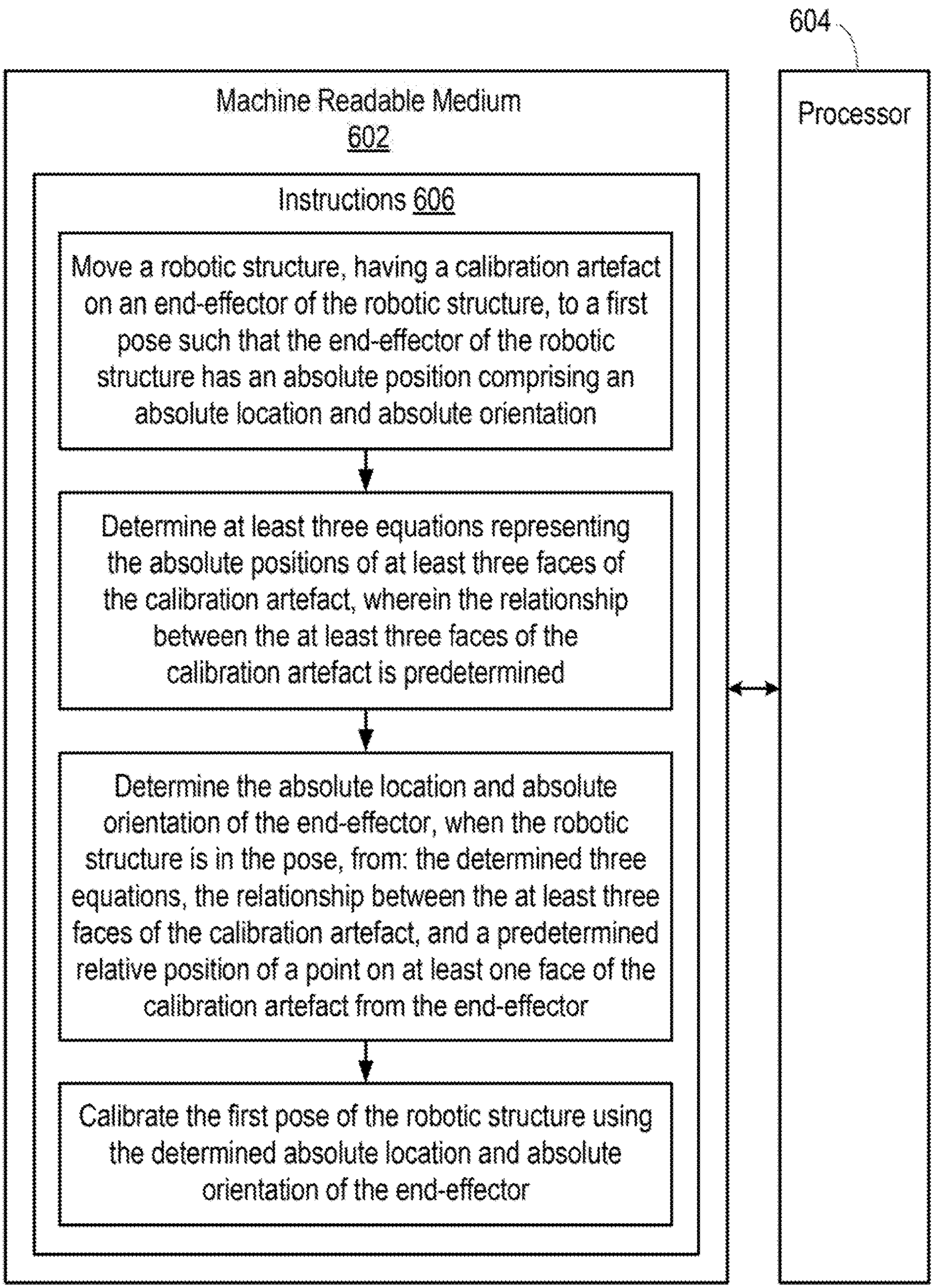
FIG. 6 illustrates an example of a machine readable medium in association with a processor.

FIG. 6 illustrates an example of a machine readable medium 602 in association with a processor 604. The machine readable medium 602 stores instructions 606 which, when executed by the processor 604 cause the processor 604 to carry out certain processes. In this example, the instructions 606 comprise instructions to: move a robotic structure, having a calibration artefact on an end-effector of the robotic structure, to a first pose such that the end-effector of the robotic structure has an absolute position comprising an absolute location and absolute orientation; determine at least three equations representing the absolute positions of at least three faces of the calibration artefact, wherein the relationship between the at least three faces of the calibration artefact is predetermined, determine the absolute location and absolute orientation of the end-effector, when the robotic structure is in the position, from: the determined three equations, the relationship between the at least three faces of the calibration artefact, and a predetermined relative position of a point on at least one face of the calibration artefact from the end-effector; and calibrate the first pose of the robotic structure using the determined absolute location and absolute orientation of the end-effector.

Therefore, both the proposed method and apparatus provide position data including both the location and orientation of the end-effector by using location measurements without any specific orientation measurement apparatus.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In some examples, a processor or processing apparatus may execute the machine readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing; thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

moving a robotic structure to a first pose such that an end-effector of the robotic structure has an absolute position comprising an absolute location and absolute orientation;

providing a calibration artefact on the end-effector, wherein the calibration artefact comprises a three-dimensional object having at least three surfaces;

while the robotic structure is in the first pose, determining at least three planes coinciding with at least three respective surface planes of the calibration artefact, by measuring absolute locations of a plurality of points on the calibration artefact;

determining the absolute location and absolute orientation of the end-effector, when the robotic structure is in the pose, based on the determined at least three planes; and calibrating the first pose of the robotic structure using the determined absolute location and absolute orientation of the end-effector, by solving a first optimization problem for x and y coordinates of the absolute position of the end effector, and by solving a second optimization problem for z coordinates of the absolute position of the end effector.

2. A method as claimed in claim 1 wherein there is a predetermined relative relationship between the at least three planes.

3. A method as claimed in claim 2 wherein the determining of the absolute location and absolute orientation of the end-effector is based on the predetermined relative relationship between the at least three planes.

4. A method as claimed in claim 1 wherein the determining of the at least three planes comprises measuring absolute locations for at least three points on each of the at least three planes.

5. A method as claimed in claim 1 wherein the calibration artefact is a cube.

6. A method as claimed in claim 1 wherein the determining of the absolute location and absolute orientation of the end-effector comprises calculating a normal vector for each of the at least three planes and creating a matrix, $R_{3\times3}$, of the normal vectors.

7. A method as claimed in claim 6 wherein the determining of the absolute orientation of the end-effector comprises calculating the Euler angles, $\theta$, $\phi$ and $\varphi$, of the absolute orientation by solving an inverse kinematic problem for the robotic structure, wherein the inverse kinematic problem relates the matrix $R_{3\times3}$ to the Euler angles.

8. A method as claimed in claim 1 wherein the absolute location of the end-effector is calculated from a point of intersection of the planes and a predetermined distance of the point of intersection from the end-effector.

9. A method of using a robotic structure calibrated as claimed in claim 1 further comprising:

selectively switching between a repeatability calibration and a calibration provided by the method of claim 1.

10. A calibration apparatus comprising, a calibration artefact provided on an end-effector of a robotic structure, wherein the calibration artefact comprises a three-dimensional object having at least three surfaces, and wherein the three-dimensional object is a cube, and a calibration measurement apparatus comprising a processor to:

move the robotic structure to a first pose such that the end-effector of the robotic structure has an absolute position comprising an absolute location and absolute orientation, while the robotic structure is in the first pose, measure absolute locations for a plurality of points on at least one of the surfaces of the calibration artefact;

determine from the plurality of points at least three equations representing the absolute positions of the at least three surfaces of the calibration artefact;

determine the absolute location and absolute orientation of the end-effector, when the robotic structure is in the first pose, from the determined at least three equations; and calibrate the first pose of the robotic structure using the determined absolute location and absolute orientation of the end-effector.

11. A calibration apparatus as claimed in claim 10 wherein to determine the at least three equations the calibration measurement apparatus measures absolute locations for at least three points on each of the surfaces of the calibration artefact.

12. A calibration apparatus as claimed in claim 9 wherein to calibrate the pose of the robotic structure a minimization is applied to a forward kinematic function of the robotic structure, wherein the forward kinematic function relates the absolute position of the end effector to joint parameters which describe the pose of the robotic structure.

13. A calibration apparatus as claimed in claim 9 wherein to calibrate the pose of the robotic structure a first optimization problem is solved for the x and y coordinates of the absolute position of the end effector, and a second optimization problem is solved for the z coordinates of the absolute position of the end effector.

14. A non-transitory machine readable medium storing instructions which, when executed by a processor cause the processor to:

move a robotic structure, having a calibration artefact on an end-effector of the robotic structure, to a first pose such that the end-effector of the robotic structure has an absolute position comprising an absolute location and absolute orientation, wherein the calibration artefact comprises a three-dimensional object having at least three surfaces;

determine at least three equations representing absolute positions of the at least three surfaces of the calibration artefact by measuring absolute locations for at least three points on each of the surfaces of the calibration artefact, wherein the relationship between the at least three surfaces of the calibration artefact is predetermined;

determine the absolute location and absolute orientation of the end-effector, when the robotic structure is in the first pose, from: the determined three equations, the relationship between the at least three surfaces of the calibration artefact, and a predetermined relative position of a point on at least one of the surfaces of the calibration artefact from the end-effector; and calibrate the first pose of the robotic structure using the determined absolute location and absolute orientation of the end-effector.

* * * * *